United States Patent [19]
Freeman

[11] Patent Number: 5,339,706
[45] Date of Patent: Aug. 23, 1994

[54] LATCHABLE STEERING COLUMN TILT MECHANISM

[75] Inventor: Hobart R. Freeman, Monroe, Mich.

[73] Assignee: Chrysler Corporation, Highland Park, Mich.

[21] Appl. No.: 38,206

[22] Filed: Mar. 26, 1993

[51] Int. Cl.5 ............................................. B62D 1/18
[52] U.S. Cl. .................... 74/493; 74/577 R; 280/775
[58] Field of Search ............... 74/493, 577 R, 577 M; 280/775

[56] References Cited

U.S. PATENT DOCUMENTS

| | | | |
|---|---|---|---|
| 3,167,971 | 2/1965 | Zeigler et al. | 74/493 |
| 3,302,478 | 2/1967 | Pauwels | 74/493 |
| 3,382,944 | 5/1968 | Zeigler et al. | 180/111 |
| 3,473,405 | 10/1969 | Deford et al. | 74/493 |
| 3,487,711 | 1/1970 | Sippel | 74/493 |
| 4,029,168 | 6/1977 | Kramer | 74/493 X |
| 4,472,982 | 9/1984 | Nishikawa | 74/493 |
| 4,793,204 | 12/1988 | Kubasiak | 74/493 |
| 4,892,330 | 1/1990 | Beauch | 280/775 |
| 4,938,093 | 7/1990 | Matsumoto et al. | 74/493 |
| 4,970,910 | 11/1990 | Cymbal | 74/493 |

*Primary Examiner*—Allan D. Herrmann
*Assistant Examiner*—David W. Laub
*Attorney, Agent, or Firm*—Edward A. Craig

[57] ABSTRACT

A latchable tilt mechanism for a steering column of a vehicle includes a first bracket attached to a sleeve of the steering column and a second bracket pivotally attached to the first bracket and operatively connected to a rotatable steering wheel of the steering column. The latchable tilt mechanism also includes a plurality of pawls pivotally attached to the second bracket and urged into engagement with a latching member. The latchable tilt mechanism has a lever which rotates the pawls out of engagement with the latching member. The pawls have a plurality of locking slots which are distinct from one another but which are configured to operate in concert to allow a discrete pawl to be restraining the steering column from tilting in one direction and another in an opposite direction.

9 Claims, 5 Drawing Sheets

LATCHABLE STEERING COLUMN TILT MECHANISM

BACKGROUND OF THE INVENTION

1. Field of the Invention

The present invention relates generally to steering columns for vehicles, and more particularly to a tilt mechanism for a steering column of an automotive vehicle.

2. Description of the Related Art

In a steering column of an automotive vehicle, a steering shaft has a steering wheel at one end. The steering shaft is extended through a rigid sleeve and rotatable therein. The steering column may be of a tilt or non-tilt type.

The tilt steering column allows the driver of the vehicle to adjust the height and angle of the steering wheel depending on the driver's stature, seat position, and comfort. Typically, the tilt steering column also allows for an exit position, whereby the steering wheel is placed in an uppermost position to allow easier ingress and egress to the vehicle.

An example of a tilt type steering column is disclosed in U.S. Pat. No. 3,302,478 to Pauwels. The '478 patent to Pauwels illustrates a dual pawl or rachet system in which the pawls are biased into engagement with corresponding ratchets such that one of the pawls will be in a locking engagement while the other is not. One disadvantage of the above patented tilt type steering column is that only one pawl is in locking engagement. Another disadvantage is that the one pawl locking engagement lacks a desired strength for the steering column. Thus, there is a need in the art to provide a tilt type steering column which has a dual locking engagement and increased strength.

SUMMARY OF THE INVENTION

It is, therefore, one object of the present invention to provide a latchable steering column tilt mechanism for an automotive vehicle.

It is another object of the present invention to provide a latchable steering column tilt mechanism which has a dual pawl locking arrangement.

It is a further object of the present invention to provide a latachable steering column tilt mechanism which provides increased strength and allows a more secure and greater number of intermittent tilt positions.

To achieve the foregoing objects, the present invention is a latchable tilt mechanism for a steering column of a vehicle. The tilt mechanism includes a first bracket attached to a sleeve of the steering column and a second bracket pivotally attached to the first bracket and operatively connected to a rotatable steering wheel of the steering column. The tilt mechanism also includes a plurality of pawls pivotally attached to the second bracket and being rotatable between a first locking position and a second release position and a spring operationally associated with each of the pawls for urging the pawls into the first locking position. The tilt mechanism further includes a release lever pivotally attached to the second bracket for engaging the pawls and moving the pawls into the second release position and means between the first bracket and pawls for engaging at least two of the pawls to restrain the second bracket from rotational movement when the pawls are in the first locking position.

One advantage of the present invention is that a latchable tilt mechanism is provided for a steering column of an automotive vehicle. Another advantage of the present invention is that the latchable steering column tilt mechanism always has two pawls engaged to provide increased strength of the tilt mechanism to the steering column. Yet another advantage of the present invention is that the latchable steering column tilt mechanism provide a greater number of intermittent tilt positions.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
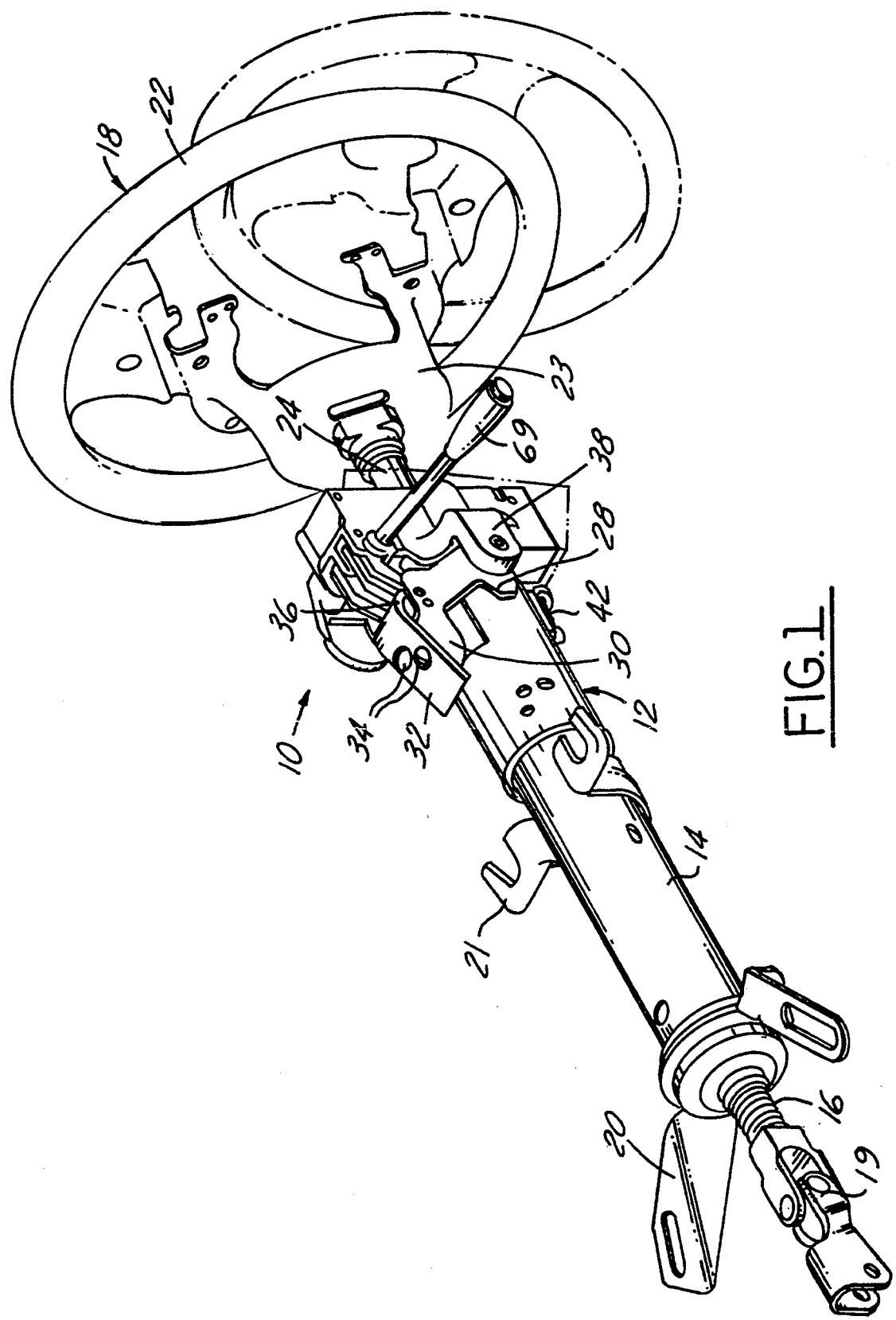
FIG. 1 is a perspective view of a tilt mechanism, according to the present invention, illustrated in operational relationship to a steering column of a vehicle.

Referring now to the drawings, especially to FIG. 1, a latchable tilt mechanism 10 is illustrated in operational relationship with a steering column, generally indicated at 12, for a vehicle such as an automotive vehicle (not shown). The steering column 12 includes a rigid sleeve 14 and a steering shaft 16 which extends through the rigid sleeve 14 and is connected to a steering wheel assembly, generally indicated at 18, at its upper end and to a shaft coupler 19 at its lower end. It should be appreciated that the shaft coupler 19 is operably connected to a steering gear assembly (not shown) for steering of wheels of the vehicle. The steering column 12 also includes a pair of brackets 20 and 21 attached to the sleeve 14 by suitable means such as welding for mounting the sleeve 14 to vehicle support structure such as a dash assembly (not shown) of the vehicle.

Figure 2:
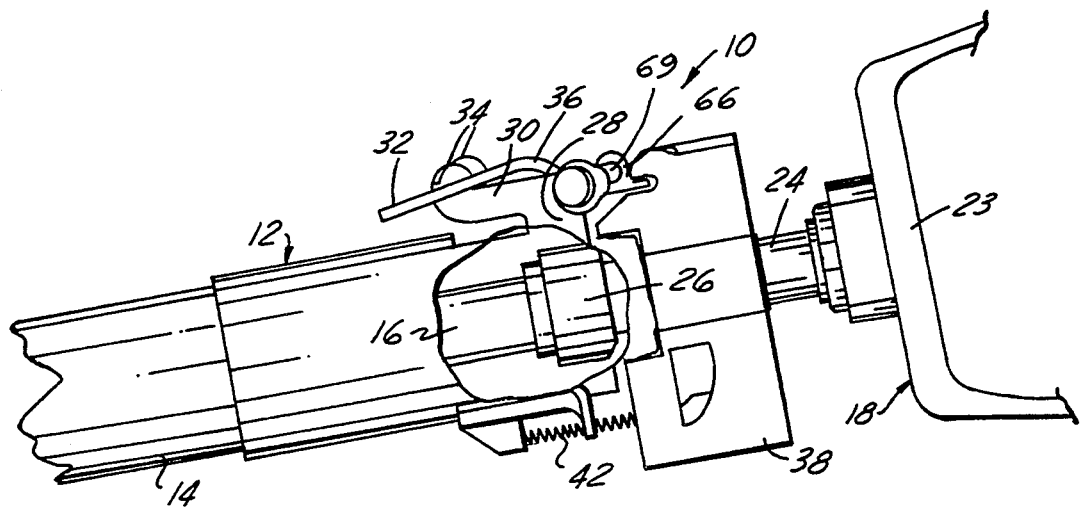
FIG. 2 is a fragmentary elevational view of a portion of the steering column of FIG. 1.
Figure 3:
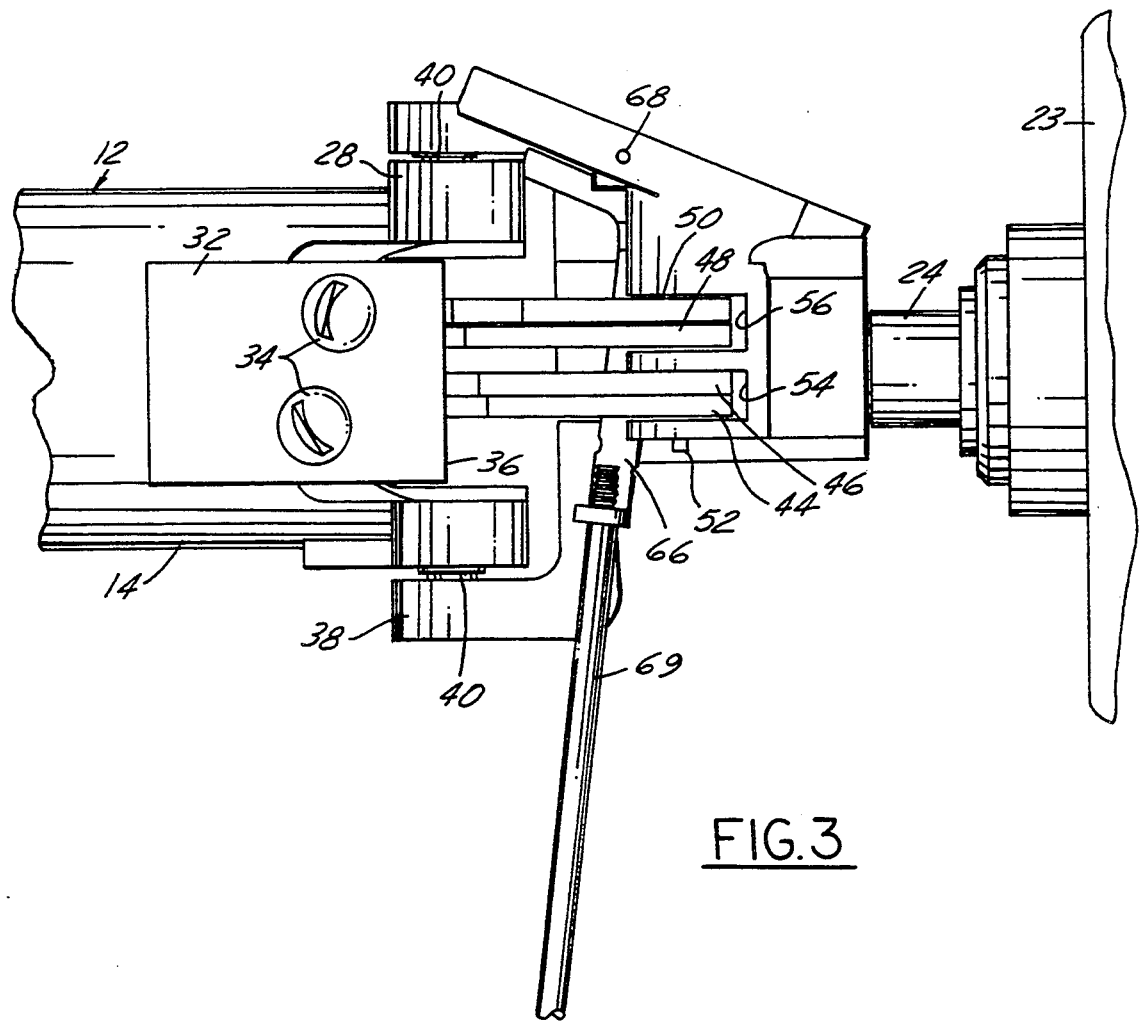
FIG. 3 is a plan view of the tilt mechanism of FIG. 1.

Referring to FIGS. 1 through 3, the steering wheel assembly 18 includes a steering wheel 22 connected by a bracket 23 to a wheel shaft 24. The wheel shaft 24 is coupled to the steering shaft 16 by a coupler 26. It should be appreciated that the coupler 26 is conventional and known in the art to allow the wheel shaft 24 to pivot or rotate relative to the steering shaft 16.

The latchable tilt mechanism 10 includes a first bracket 28 secured to the sleeve 14 by suitable means such as welding. The first bracket 28 forms a saddle which is disposed about the sleeve 14 and has an extension 30 extending axially away from the steering wheel assembly 18. The latchable tilt mechanism 10 also includes a latching member 32 secured to the extension 30 by suitable means such as screws 34. The latching member 32 has a hook portion or arm 36 extending generally downwardly ninety (90) degrees toward the coupler 26. It should be appreciated that the latching member 32 and first bracket 28 are fixed relative to the sleeve 14.

The latchable tilt mechanism 10 further includes a second bracket 38 pivotally secured to the first bracket 28 by suitable means such as pins 40. The pins 40 allow the second bracket 38 to pivot or rotate upwardly and downwardly relative to the first bracket 28 as illustrated by phantom lines in FIG. 1. The latchable tilt mechanism 10 also includes a spring 42 interconnecting the second bracket 38 and the sleeve 14 to urge the second bracket 38 in an uppermost position relative to the first bracket 28. It should be appreciated that the wheel shaft 24 extends through the second bracket 38 and pivots or rotates with the second bracket 38.

Figure 4:
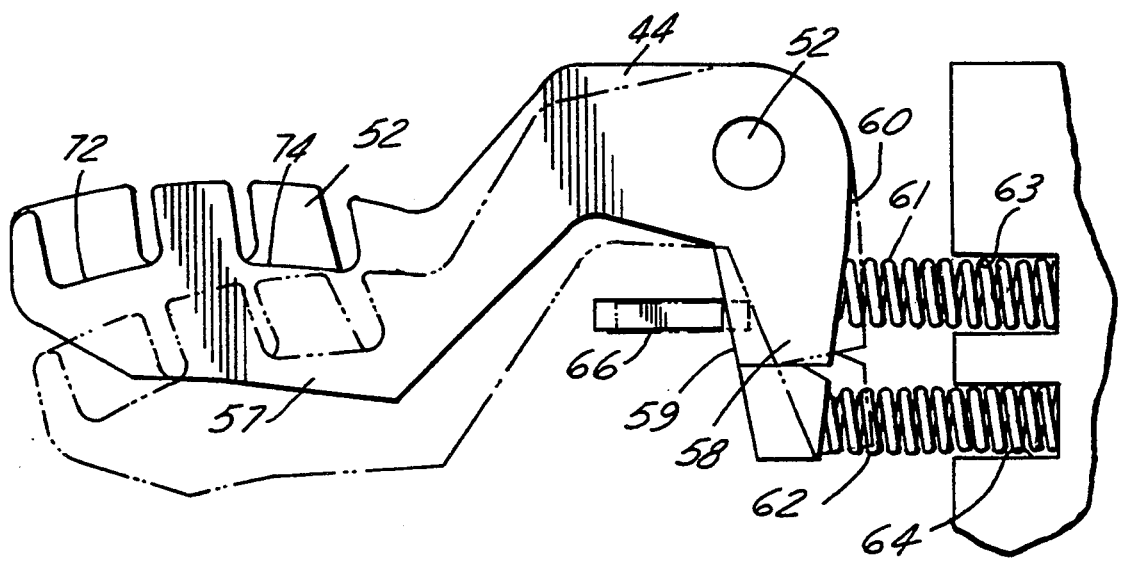
FIG. 4 is a partial elevational view of a portion of the tilt mechanism of FIGS. 1 and 3 illustrating engaged and disengaged positions.

Referring to FIGS. 3 and 4, the latchable tilt mechanism 10 also includes a plurality of, preferably four (4), pawls 44,46,48,50 pivotally mounted on a pin 52 to the second bracket 38. The second bracket 38 has a pair of recesses 54 and 56 spaced laterally in an upper portion thereof. The pawls 44,46 are disposed in recess 54 and pawls 48,50 are disposed in recess 56. The pin 52 extends through the pawls 44,46,48,50 and recesses 54,56 and is secured by suitable means such as press-fitting in the second bracket 38. Each of the pawls 44,46,48,50 has an axially extending forward portion 57 and a vertically extending rear portion 58. The rear portion 58 has a release surface 59 and an engagement surface 60 for a function to be described.

The latachable tilt mechanism 10 also includes a plurality, preferably two (2) pairs of springs 61 and 62 disposed between pawls 44,46 and 48,50, respectively, and the second bracket 38. The springs 61 are partially disposed in laterally spaced recesses 63 of the second bracket 38 and engage the engagement surface 60 of the pawls 44,50 and the springs 62 are partially disposed in laterally spaced recesses 64 of the second bracket 38 and located below the recesses 63 and engage the engagement surface 60 of pawls 46,48. It should be appreciated that the springs 61,62 urge the pawls 44,46,48,50 to rotate upwardly and or clockwise about the pin 52. It should also be appreciated that pawls 46,48 have a recess 65 on the engagement surface 60 to prevent the springs 61 from engaging the pawls 46,48 and that the rear portion 58 of pawls 44,50 are shorter in length to prevent the springs 62 from engaging the pawls 44,50.

The latachable tilt mechanism 10 further includes a release lever 66 pivotally mounted to the second bracket 38 by suitable means such as a pin 68. The release lever 66 also includes a handle 69 threadably attached thereto to allow an operator to move the release lever 66 for a function to be described.

Referring to FIGS. 5A through 5D, the forward portion 57 of each pawl 44,46,48,50 has two locking slots or notches 72,74 formed therein. The slots 72,74 are generally rectangular in shape. All of the slots 72,74 except for groove 72C, have a forward edge 76 and a rear edge 78. The slot 72C only has a rear edge 78. The slots 72,74 on each of the pawls 44,46,48,50 are staggered axially relative to each other to provide a predetermined number of locking or tilt positions. It should be appreciated that the slots 72,74 engage the latching element 32 in the tilt positions to be described.

Referring to FIGS. 6A through 6D, the pawls 44,46,48,50 and arm 36 of the latching member 32 are illustrated for a plurality of, preferably seven, tilt positions. The slots 72,74 are configured such that at least two pawls 44,46,48, 50 engage the arm 36 of the latching member 32 in each tilt position. For example, in tilt position 1, the arm 36 is disposed in slot 74A of the pawl 44 and slot 74B of pawl 46. The rear edge 78 of groove 74A engages the arm 36 to prevent the second bracket 38 from moving or rotating upwardly and the forward edge 76 of groove 74B engages the arm 36 to prevent the second bracket 38 from moving or rotating downwardly.

Preferably, the latching member 32 and pawls 44,46,48, 50 are made of a high-strength and rigid material such as tempered steel and of sufficient thickness to provide a predetermined strength. For example, the pawls 44,46,48,50 are made of 3.5 mm thick stock tempered steel (SAE 1060). Alternatively, the latching member 32 may be a cylindrical pin. All four pawls 44,46,48,50 are located in a single area which is relatively accessible. As a result, all four pawls 44,46,48,50 can be simultaneously checked for wear and are easily replaced by simply removing the screws 34 and the latching member 32 and removing the pin 52.

Referring to FIGS. 4 and 6A through 6D, seven possible tilt or locking positions are illustrated for engagement between the latching member 32 and pawls 44,46,48,50. In operation, when the handle 69 is pulled toward the steering wheel 22, the release lever 66 is rotated counter-clockwise or axially toward the steering wheel 22 to contact the release surface 59 of rear portion 58. The applied pressure from the release lever 66 on the release surface 59, overcomes the spring load at the engagement surface 60, rotating the pawls 44,46,48,50 counter clockwise and disengaging the slots 72,74 from the latching member 32. The steering wheel assembly 18 is then manually rotated and repositioned as desired. The handle 69 is then released, thereby releasing the release lever 66 and causing the pawls 44,46,48,50 to rotate clockwise on the pin 52. The pawls 44,46,48,50 then contact the latching member 32. The arm 36 of the latching member 32 is received in the slots 72,74 of two pawls 44,46,48,50 and forces the other two pawls 44,46,48,50 with no slot available, counter-clockwise against the springs 61,62. As a result, the tilt mechanism 10 has one slot 72,74 of pawls 44,46,48,50 inhibiting clockwise rotation and one slot 72,74 of pawls 44,46,48,50 inhibiting counter-clockwise rotation of the second bracket 38 and hence the steering wheel assembly 18. It should be appreciated that two of the pawls 44,46,48,50 are not used in each of the seven possible tilt positions for the steering wheel assembly 18.

Figure 7:
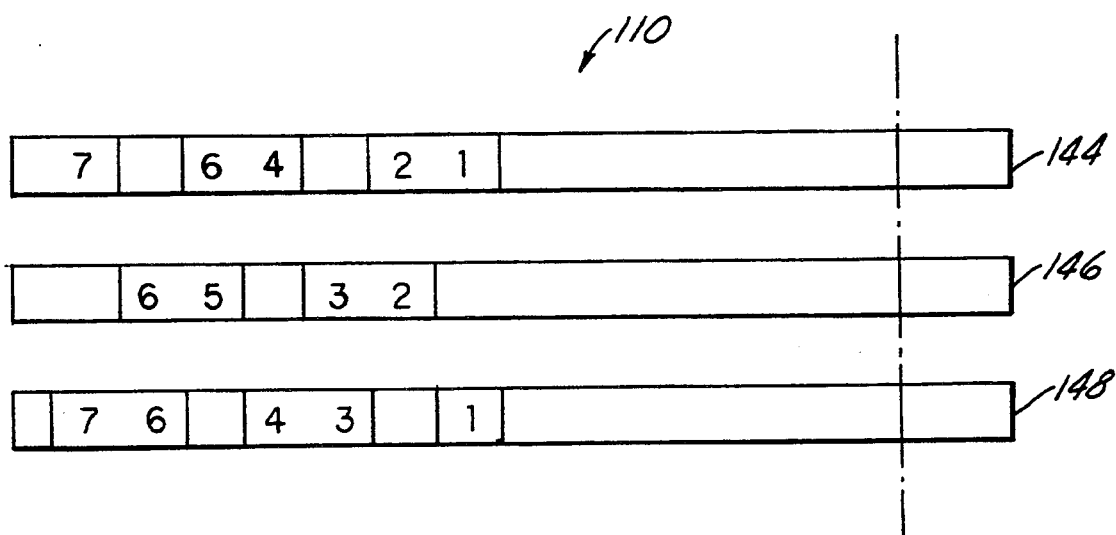
FIG. 7 is a schematic plan view of an alternate embodiment of the tilt mechanism of FIGS. 1 and 3 illustrating an alternate configuration for the seven tilt positions of FIGS. 6A through 6D.
Figure 5A:
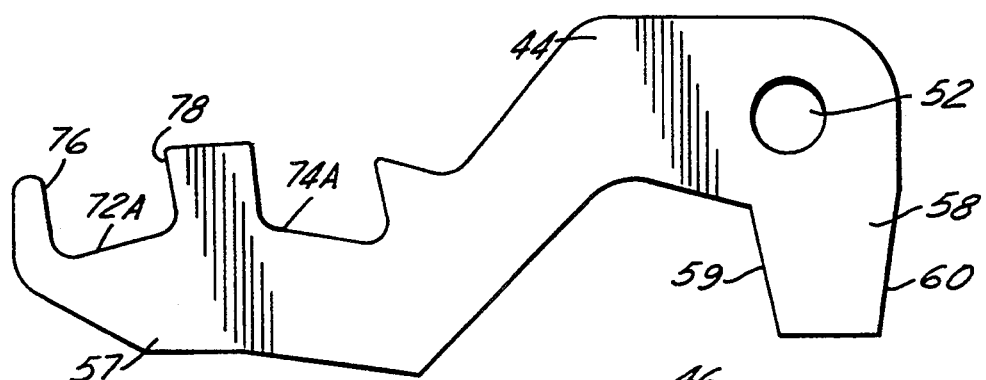
FIGS. 5A through 5D are elevational views illustrating a configuration of pawls for the tilt mechanism of FIGS. 1 and 3.
Figure 5B:
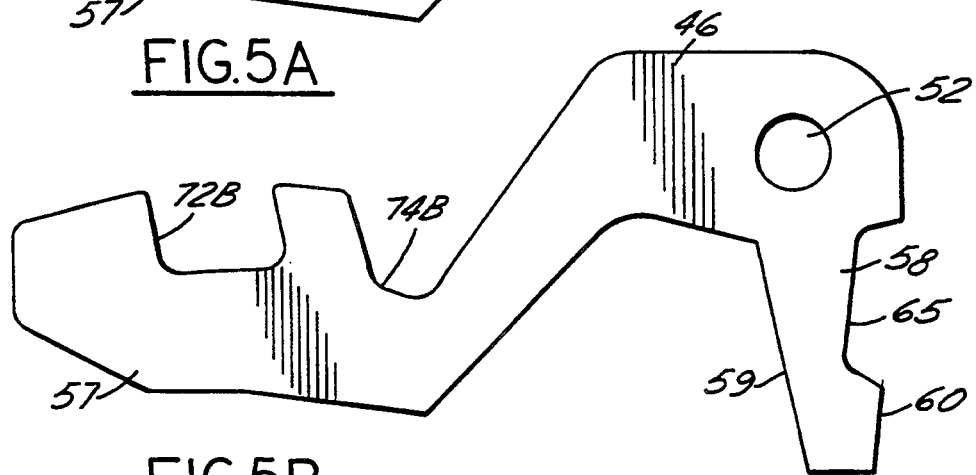
Figure 5C:
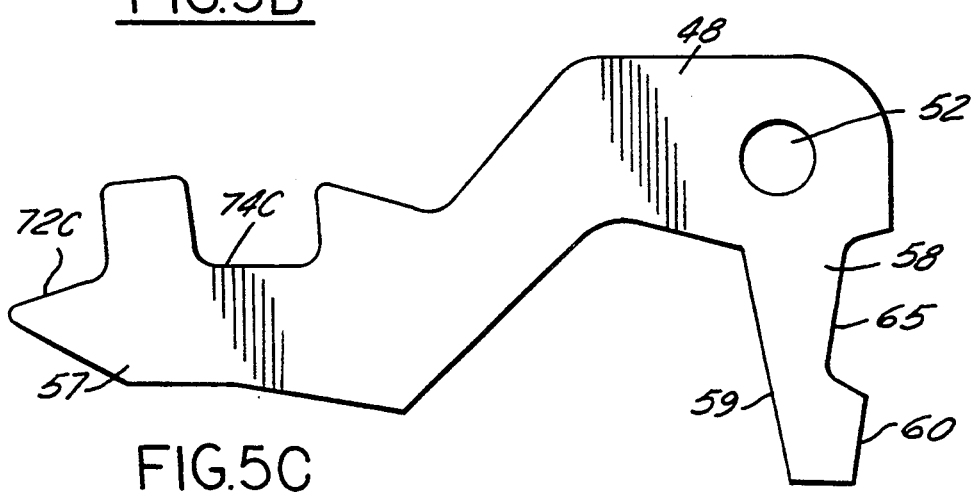
Figure 5D:
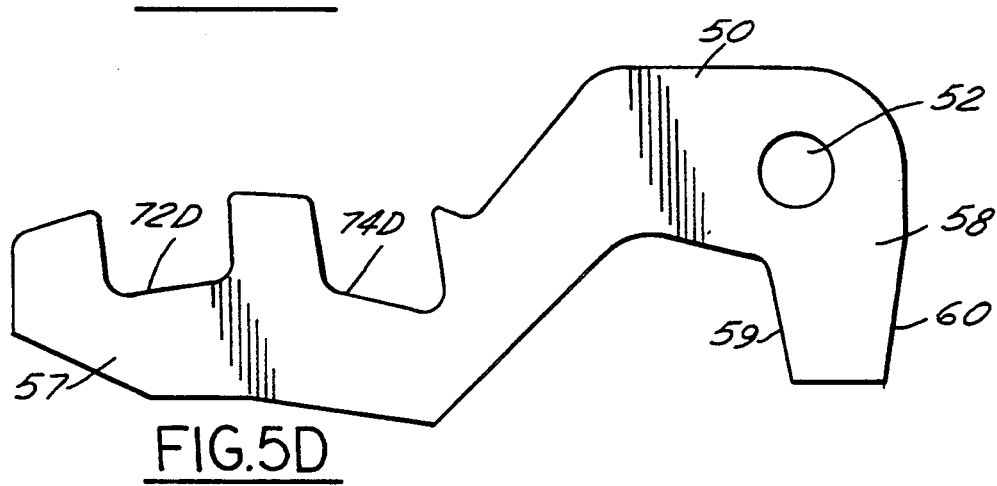
Figure 6A:
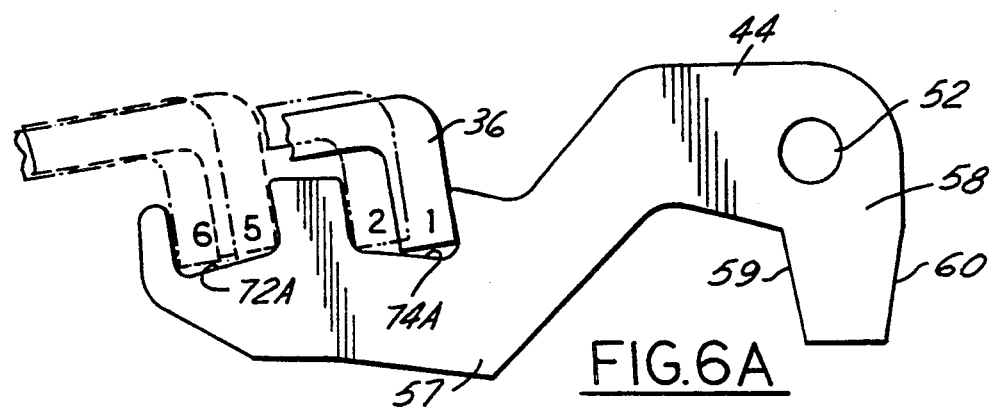
FIGS. 6A through 6D are views similar to FIGS. 5A through 5D, illustrating the engaged positions of the pawls in each of seven tilt positions.
Figure 6B:
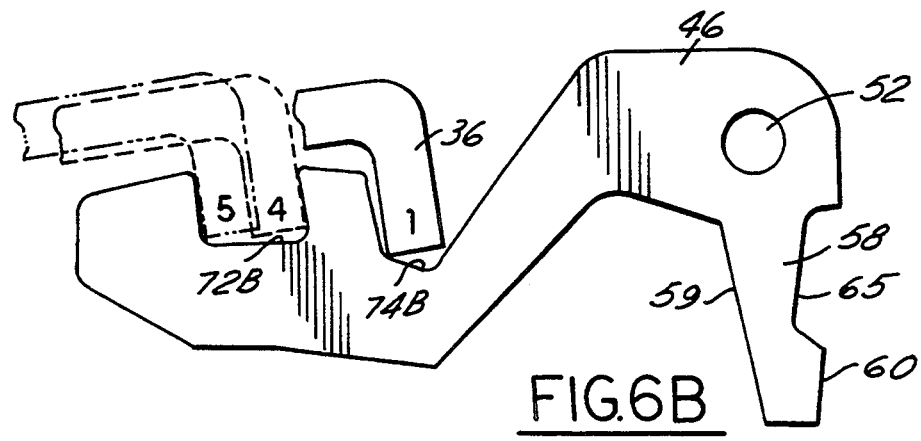
Figure 6C:
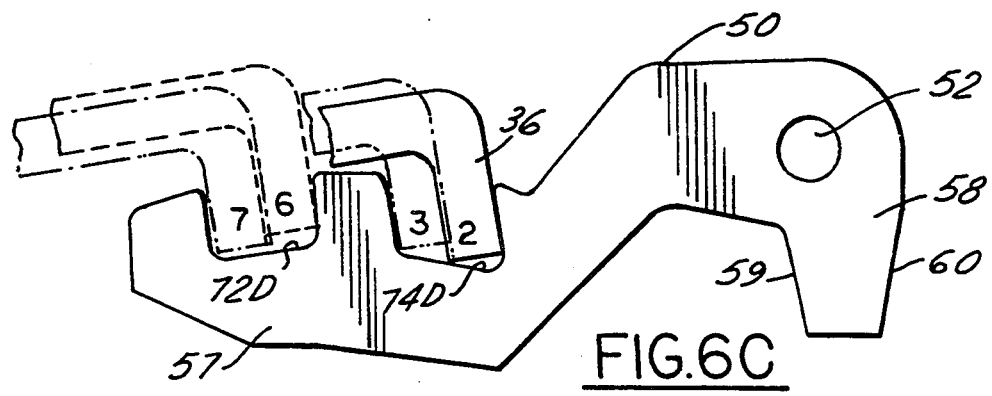
Figure 6D:
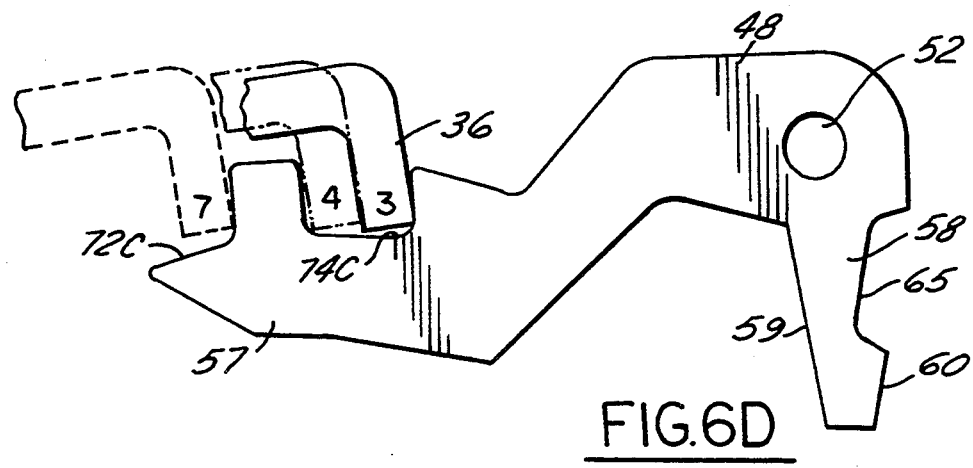

Referring to FIG. 7, an alternate embodiment of the latchable tilt mechanism 10 is shown. Like parts have like reference numerals increased by one hundred (100). The tilt mechanism 110 includes three of the pawls 144,146,148 are utilized instead of the four pawls 44,46,48,50 of the tilt mechanism 10. The three pawls are illustrated with the position of the arm 36 of the latching member 32 in the locking slots for each of the seven positions, in a similar respect that the positions are shown in FIGS. 6A through 6D. It should be appreciated that the configuration in FIG. 7 still provides two discrete pawls to restrict movement relative to the latching member 32 in each direction for each of the seven positions.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A latchable tilt mechanism for a steering column comprising:
    a first bracket attached to a sleeve of the steering column;
    a second bracket pivotally attached to said first bracket and operatively connected to a rotatable steering wheel of the steering column;
    a plurality of pawls pivotally attached to said second bracket, said pawls being rotatable between a first locking position and a second release position;
    a spring operationally associated with each of said pawls for urging said pawls into said first locking position;
    a release lever pivotally attached to said second bracket for engaging said pawls to move said pawls to said second release position; and
    means between said first bracket and said pawls for engaging at least two of said pawls to restrain said second bracket from rotational movement when said pawls are in said first locking position, said means comprising each of said pawls having at least one locking slot and a latching member attached to said first bracket to engage said at least one locking slot, said latching member having an arm extending toward said pawls and being disposed in at least one locking slot in said first locking position.

2. A latchable tilt mechanism for a steering column comprising:
    a first bracket attached to a sleeve of the steering column;
    a second bracket pivotally attached to said first bracket and operatively connected to a rotatable steering wheel of the steering column;
    a plurality of pawls pivotally attached to said second bracket, said pawls being rotatable between a first locking position and a second release position;
    a spring operationally associated with each of said pawls for urging said pawls into said first locking position;
    a release lever pivotally attached to said second bracket for engaging said pawls to move said pawls to said second release position; and
    means between said first bracket and said pawls for engaging at least two of said pawls to restrain said second bracket from rotational movement when said pawls are in said first locking position, each of said pawls having at least two locking slots, said locking slots on each of said pawls being staggered axially relative to each other to provide a predetermined number of first locking positions.

3. A latchable tilt mechanism as set forth in claim 2 wherein said predetermined number of first locking positions comprises seven.

4. A latchable tilt mechanism as set forth in claim 2 wherein said plurality of pawls comprises four.

5. A latchable tilt mechanism as set forth in claim 2 wherein said plurality of pawls comprises three.

6. A latchable tilt mechanism for a steering column of a vehicle, the steering column including a fixed sleeve and a steering wheel assembly pivotal relative to said sleeve, comprising;
    a first bracket attached to the sleeve;
    a second bracket pivotally attached to said first bracket and operatively connected to the steering wheel assembly;
    a latching member fixedly attached to said first bracket;
    a plurality of pawls pivotally attached to said second bracket, said pawls each having at least one locking slot for engaging said latching member in a locking position to restrict pivotal motion of said second bracket and said steering wheel assembly in one angular direction by at least one pawl and in the other angular direction by at least one other pawl.

7. A latchable tilt mechanism as set forth in claim 6 wherein said plurality of pawls comprises at least three pawls each having at least two locking slots to provide a plurality of locking positions.

8. A latchable tilt mechanism as set forth in claim 6 including a spring associated with each of said pawls for urging the pawls into the locking position and a release lever pivotally attached to the second bracket for engaging and moving the pawls to an unlocked position.

9. A latchable steering column tilt mechanism comprising:
    a fixed sleeve;
    a steering wheel assembly pivotal relative to said sleeve;
    a first bracket attached to said sleeve;
    a second bracket pivotally attached to said first bracket and operatively connected to said steering wheel assembly;
    a plurality of pawls pivotally attached to said second bracket, said pawls being rotatable between a first locking position and a second release position;
    a spring operationally associated with each of said pawls for urging said pawls into said first locking position;
    a release lever pivotally attached to said second bracket for engaging said pawls to move said pawls to said second release position;
    each of said pawls having at least one locking slot and a latching member attached to said first bracket for engaging said at least one locking slot in at least two of said pawls to restrain said second bracket from rotational movement when said pawls are in said first locking position;
    said latching member having an arm extending toward said pawls and being disposed in at least one locking slot in said first locking position;
    said locking slots on each of said pawls being staggered axially relative to each other to provide a predetermined number of first locking positions.

* * * * *